(12) United States Patent
Johansson et al.

(10) Patent No.: US 9,516,524 B2
(45) Date of Patent: Dec. 6, 2016

(54) TRANSMITTER ASSISTED QUALITY OF SERVICE MEASUREMENT

(71) Applicant: MEDIATEK, INC., Hsin-Chu (TW)

(72) Inventors: Per Johan Mikael Johansson, Kungsangen (SE); Yih-Shen Chen, Hsinchu (TW); Chia-Chun Hsu, Taipei (TW)

(73) Assignee: MEDIATEK, INC., Hsin-Chu (TW)

( * ) Notice: Subject to any disclaimer, the term of this patent is extended or adjusted under 35 U.S.C. 154(b) by 65 days.

(21) Appl. No.: 13/659,086

(22) Filed: Oct. 24, 2012

(65) Prior Publication Data

US 2013/0100840 A1  Apr. 25, 2013

Related U.S. Application Data

(60) Provisional application No. 61/551,029, filed on Oct. 25, 2011.

(51) Int. Cl.
*H04L 12/26* (2006.01)
*H04W 24/08* (2009.01)

(52) U.S. Cl.
CPC ............ *H04W 24/08* (2013.01); *H04L 43/045* (2013.01); *H04L 43/0852* (2013.01); *H04L 43/0888* (2013.01)

(58) Field of Classification Search
CPC ...... H04W 4/027; H04W 24/10; H04W 24/08; H04W 24/02; H04W 24/06; H04W 28/02; H04W 36/26; H04W 36/30; H04W 48/18; H04W 48/20; H04W 52/0209; H04W 52/0225; H04W 60/04; H04B 1/1027; H04L 43/0888; H04L 43/045; H04L 43/0852

(Continued)

(56) References Cited

U.S. PATENT DOCUMENTS 7,496,044 B1 * 2/2009 Wing ............................ 370/242
8,023,976 B2 * 9/2011 Shao et al. ..................... 455/502
(Continued)

FOREIGN PATENT DOCUMENTS

CN  1354575 A  6/2002
CN  1859233 A  11/2006
(Continued)

OTHER PUBLICATIONS

3GPP TS 36.321, 3rd Generation Partnership Project; Technical Specification Group Radio Access Network; Evolved Universal Terrestrial Radio Access (E-UTRA); Medium Access Control (MAC) protocol specification (Release 10) , Dec. 2010, 3GPP, Version 10.0.0.*

(Continued)

*Primary Examiner* — Michael Thier
*Assistant Examiner* — Eric Nowlin
(74) *Attorney, Agent, or Firm* — Imperium Patent Works; Zheng Jin; Helen Mao (57) ABSTRACT

A method and apparatus for transmitter assisted Quality of Service (QoS) measurement. Time information is generated by the transmitter and transmitted along with a data transmission. A receiving device determines a QoS measurement based upon the time information and the received data. The time information indicates when the data was made available for transmission, which data transmission blocks belong to a single data transmission, and when a transmitter buffer was emptied. The QOS measurements are performance measurement such as, latency measurements and throughput measurements. The time information indicates a time reference relative to the timing of a wireless interface. The time reference is a System Frame Number (SFN), a Connection Frame Number (CFN), a relative count of frame numbers, a count of sub-frames, or a count of Time Trans- (Continued)

IMPROVED THROUGHPUT MEASUREMENT mission Intervals (TTIs). An aggregated QOS measurement is generated based upon the QOS measurement.

18 Claims, 8 Drawing Sheets

(58) Field of Classification Search
USPC .............. 370/329, 328, 252, 230, 412, 229, 235,370/468, 470, 232, 233, 253; 455/450, 452.2, 455/63.1, 67.11; 375/295; 714/748
See application file for complete search history.

(56) References Cited

U.S. PATENT DOCUMENTS

| | | | |
|---|---|---|---|
| 8,274,992 B2* | 9/2012 | Nishibayashi et al. | 370/447 |
| 2003/0152034 A1* | 8/2003 | Zhang et al. | 370/252 |
| 2006/0104279 A1* | 5/2006 | Fellman et al. | 370/392 |
| 2007/0097852 A1* | 5/2007 | Thesling | 370/206 |
| 2009/0054001 A1* | 2/2009 | Westerberg et al. | 455/67.11 |
| 2010/0067380 A1* | 3/2010 | Teng | 370/235 |
| 2011/0243029 A1 | 10/2011 | Mack-Crane et al. | 370/253 |
| 2012/0057457 A1* | 3/2012 | Ahmadi | 370/235 |
| 2012/0281715 A1* | 11/2012 | Shojania | H04L 12/2671 370/468 |

FOREIGN PATENT DOCUMENTS

| | | |
|---|---|---|
| CN | 101175286 | 5/2008 |
| CN | 101175286 A | 5/2008 |
| EP | 2348778 A1 | 7/2011 |
| JP | 200654779 | 2/2006 |
| JP | 2007116283 | 5/2007 |

OTHER PUBLICATIONS

3GPP TS 36.323, 3rd Generation Partnership Project; Technical Specification Group Radio Access Network; Evolved Universal Terrestrial Radio Access (E-UTRA); Packet Data Convergence Protocol (PDCP) specification (Release 10), Dec. 2010 , 3GPP, Version 10.0.0.*
International Search Report and Written Opinion of International Search Authority for PCT/CN2012/083482 dated Jan. 31, 2013 (11 pages).
JPO, Office Action for JP patent application 2014-537479 dated Jan. 6, 2015 (20 pages).
"3GPP TS 36.321, 3rd Generation Partnership Project" Dec. 21, 2010, V10.0.0 pp. 30 and 33 to 44, Medium Access Control (MAC) Protocol Specification, URL.
"3GPP TS 36.322, 3rd Generation Partnership Project" Dec. 21, 2010, V10.0.0, p. 20, Radio Link Control (RLC) Protocol Specification, URL.
"3GPP TS 36.323, 3rd Generation Partnership Project" Dec. 21, 2010, V10.0.0, pp. 13, 19 to 20 and 22, Packet Data Convergence Protocol (PDCP) Specification, URL.
SIPO, Search Report for the CN patent application 201280003884.5 dated Jun. 3, 2015 (6 pages).
EPO, Search Report for the EP patent application 12843728.2 dated Jul. 23, 2015 (10 pages).
3GPP TS 36.314 V10.2.0 (Sep. 2011); 3rd Generation Partnership Project; Technical Specification Group Radio Access Network; Evolved Universal Terrestrial Radio access (E-UTRA); Layer 2—Measurements (Release 10) (18 pages).

* cited by examiner

THROUGHPUT MEASUREMENT AS PER 36.314

FIG. 3

IMPROVED THROUGHPUT MEASUREMENT

FIG. 4

LATENCY MEASUREMENT

FIG. 5

IMPROVED LATENCY MEASUREMENT

FIG. 6

EARLIEST DETERMINATION OF LATENCY START TIME BY RAN
WITHOUT TRANSMITTER TIME INFORMATION

FIG. 7

COMMUNICATION OF TIME INFORMATION WITHIN A CONTROL
ELEMENT OF THE MAC PAYLOAD

FIG. 8

TIME INFORMATION INCLUDING MULTIPLE TIME REFERENCES

FIG. 9

FLOWCHART OF A TRANSMITTER ASSISTED MEASUREMENT

FIG. 10

FLOWCHART OF A TRANSMITTER ASSISTED MEASUREMENT WITH MEASUREMENT AGGREGATION

FIG. 11

FLOWCHART OF A TRANSMITTER ASSISTED MEASUREMENT IN THE EVENT OF A CONNECTION INTERRUPTION

TRANSMITTER ASSISTED QUALITY OF SERVICE MEASUREMENT

CROSS REFERENCE TO RELATED APPLICATIONS

This application claims priority under 35 U.S.C. §119 from U.S. Provisional Application No. 61/551,029, entitled "Transmitter assisted QoS measurement in the receiver," filed on Oct. 25, 2011, the subject matter of which is incorporated herein by reference.

TECHNICAL FIELD

The disclosed embodiments of the present invention relate generally to wireless communication technology and, more particularly, relate to a method and apparatus for performing transmitter assisted quality of service measurements.

BACKGROUND

The modern era of communications has brought about an enormous expansion of wireline and wireless networks. Computer networks, television networks, and telephony networks are experiencing an unprecedented technological expansion, fueled by consumer demands, while providing more flexibility and immediacy for information transfer.

Current and future networking technologies continue to facilitate ease of information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards. A benefit of modern wireless technologies optimized for data transmission is the fast adaptation of the transmission to radio conditions, that normally varies extensively when a user is moving. A fundamental part of the fast adaptation is having a very fast protocol for retransmissions or adding coding redundancy by additional transmissions. This also means that the latency may vary significantly due the a priori unknown amount of transmissions that is needed in order to transfer a certain chunk of data. Furthermore, different to wireline communication and less dynamic wireless communication the data rate is expected to vary extensively when the user moves, which further adds uncertainty to the time needed for the actual transmission of a chunk of data, during which time the data is still buffered in the transmitter and has not been fully received in the receiver.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. By providing access to users while enabling user mobility, services are available to users while the users remain mobile. However, the mobility of users requires the network to provide continuity of service to the mobile users by enabling a user's mobile terminal to be handed over between different serving stations within corresponding different cells or service areas. To verify and test radio network deployment and operation, drive tests have been conducted in the past. Drive testing typically involved the use of specific measurement tools that could be driven or carried through an area to collect data for network operation verification. Thus, manual testing and verification of radio network operation has been common.

For existing and especially for newer networks (e.g. LTE and future networks), it may be desirable to reduce the need for drive testing or walk testing to reduce manual testing of networks and therefore reduce operational costs. Accordingly, studies regarding support for minimization of drive tests (MDT) are currently popular which aim to utilize commercial terminals for reporting of relevant measurement results in order to avoid separate manual testing with special test equipment and involvement of operator personnel.

Although the current invention is not limited to the context of MDT, MDT is deemed to be the closest current art. MDT features enable UEs to perform measurements of network performance such as latency measurements and throughput measurements. Latency is the delay between a stimulus and a response. A latency measurement in the context of communications is the time expended by propagation through a communication medium and communication hardware, as well as the execution time of the required software. Latency measurements provide an indication as to the time required for data to arrive at the desired destination. A throughput measurement in the context of communications is a measure of a successfully communicated data volume over specific amount of time. Both latency and throughput measurements require an assumption as to when the data to be measured is stored into a transmit buffer before transmission of the data occurs, i.e. when that data becomes available for transmission to the protocol stack that handles the data transmission. Current MDT features or other measurement features based on the current 3GPP protocol stack fail to accurately provide an indication as to when the data team measured is stored into a transmit buffer before transmission of the data occurs.

It is the objective of the current invention to address the shortcomings in current art. It is desirable to provide a solution that fulfills the new system requirements related to performing various network performance measurements with maximum simplicity and minimum impact to the current system.

SUMMARY

A method and apparatus for performing a receiver side measurement supported by transmitter provided information is provided. In one novel aspect, time information is communicated along with a data transmission. In response, a device receiving the data transmission and the time information determines a quality of service measurement. In one example, the device is a base station. In another example, the device is a radio network controller. The time information indicates when the data became available to the transmitter communication protocols. In one example, the QoS measurement is a latency measurement. In another example, the QoS measurement is a throughput measurement. The data transmission comprises a Packet Data Convergence Protocol (PDCP), a Radio Link Control (RLC), or a Media Access Control (MAC) Service Data Unit (SDU). The information indicates a time reference relative to the timing of a wireless interface connection, the time reference being a System Frame Number (SFN), a Connection Frame Number (CFN), a relative count of frame numbers, a count of subframes, or a count of Time Transmission Intervals (TTIs). An aggregated QOS measurement is then determine based at least in part on the QOS measurement. The aggregated QOS measurement may be an average of QOS measurements, a histogram of QOS measurements, or a worst case selection of QOS measurements.

In a second novel aspect, data made available to communication protocols and time information indicating the time when the data was made available is determined. The time information and the data are transmitted to a receiving device. The time information indicates a time reference is relative to the timing of a wireless interface connection. The time reference may be a System Frame Number (SFN), a Connection Frame Number (CFN), a relative count of frame numbers, a count of sub-frames, or a count of Time Transmission Intervals (TTIs). In the event a radio connection interruption is observed and the radio connection is recovered, the time information and data are retransmitted. In the event a radio connection interruption is observed and a new radio connection is established, the time information and data are retransmitted. In another example that time information is not retransmitted when a new radio connection is established. In one example the time information is included in a Packet Data Convergence Protocol (PDCP) status report. In another example the time information is included in a Media Access Control (MAC) element.

In a third novel aspect, data is made available to communication protocols and time information indicating the time when the data was made available is determined. The time information and the data are transmitted to a receiving device. The time information indicates a time reference is relative to the timing of a wireless interface connection. The time information is transmitted when sufficient space is available in the transport block after space has been allocated for both data and mandatory layer two overhead.

In a fourth novel aspect, time information is communicated via the MAC protocol. The MAC protocol may include multiple MAC control elements. The time information is included within one of the MAC control elements. The MAC protocol information is then transmitted along with the data to the receiving device. The receiving device acquires the time information included in the MAC control element.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
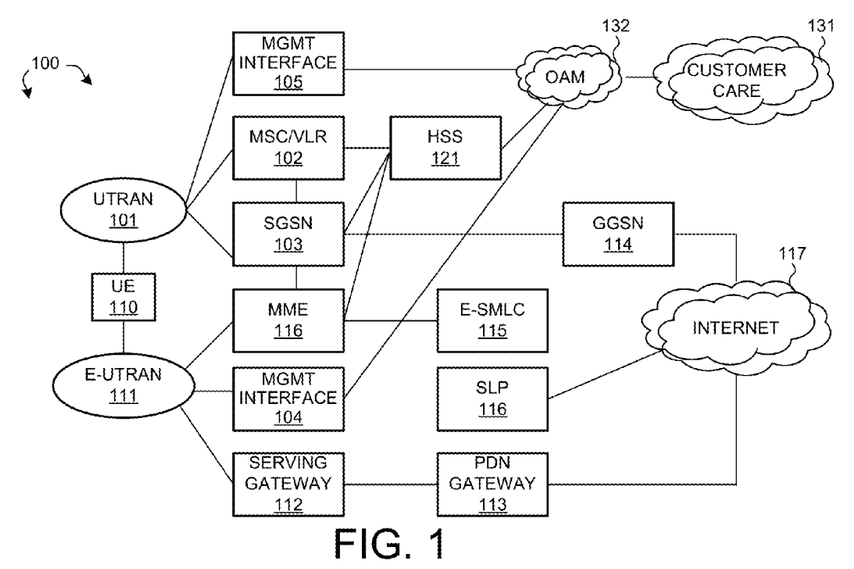
FIG. 1 illustrates 3GPP system architecture.

FIG. 1 illustrates a 3GPP system architecture in accordance with one novel aspect. 3GPP system 100 comprises an UTRAN radio access network 101, a Mobile Switching Centre or a visitor location register (MSC/VLR) 102, a serving GPRS (general packet radio service) support node (SGSN) 103, a management interface 104, a management interface a management interface 105, a user equipment UE 110, an E-UTRAN radio access network 111, a serving gateway S-GW 112, a packet data network (PDN) gateway PDN-GW 113, a policy control and routing function (PCRF) 114, operator's IP services (e.g., the Internet) 117, a home subscriber server (HSS) 121, a customer care center 131, and an Operation, Administration, and Maintenance (OAM) system 132. In the example of FIG. 1, E-UTRAN 111 provides a new air interface for cellular services to UE 110 via OFDMA (Orthogonal Frequency Division Multiple Access) technology. E-UTRAN 111 may also provide IP services to UE 110 through S-GW 112 and P-GW 113. On the other hand, UTRAN 101 is an UMTS radio access network that provides connectivity between UEs and the network via W-CDMA (Wideband Code Division Multiple Access) technology. In 3GPP LTE systems, HSS 121, S-GW 112, and PDN-GW 113, eSMLC 115, SLP 116 and other nodes (not shown) form an evolved packet core network, while the evolved packet core network and E-UTRAN 111 together form a public land mobile network (PLMN). In 3GPP UTRA systems, HSS 121, MSC 102, SGSN 103, and other nodes (not shown) form a core network. UTRAN 101 and the core network together form a public land mobile network (PLMN). Standardized by Open mobile Alliance (OMA), by Secure User Plane Location (SUPL) the SLP server provides location services for UEs connected by any Access Technology. While E-UTRAN and UTRAN radio access networks are described above, one skilled in the art will appreciated that other radio access networks may be improved by the present invention. A few of these radio access networks are High Speed Downlink Packet Access (HSDPA) network, a High Speed Uplink Packet Access (HSUPA) network, a Code Division Multiple Access (CDMA) network, Self Organizing Network (SON), or an Orthogonal Frequency Division Multiple Access (OFDMA) radio access network.

3GPP introduces new features to help LTE and UTRA system operators to further optimize network planning in a cost-effective way. Minimization of Drive Test (MDT) is one of the features where UEs collect measurements and report measurement information to their serving eNBs and serving RNCs. MDT feature enables UEs to perform Operations, Administration, and Maintenance (OAM) activities, such as neighborhood detection, measurements, logging and recording for OAM purposes, which includes radio resource management (RRM) and optimization purposes. There are two types of MDT. For immediate MDT, measurements are performed by the UEs in connected state for E-UTRA and for cell DCH state for UTRA. The collected information is either measured in the network or measured in the UE and reported to the network immediately when available, by RRM procedures such as measurement reports. For logged MDT, measurements are performed and logged by the UEs in IDLE state, and also for cell_PCH and URA_PCH states for UTRA. The UEs may report the collected information to the network at a later point of time.

The UE collected measurement information (also referred to as event information), in general, may contain MDT measurement information, radio measurements, logs of broadcast communication failure information, logs of multicast communication failure information, logs of Random Access Channel (RACH) performance, and logs of communication problems including Radio Link Failure, Handover Failure, and Radio Resource Control (RRC) Connection Establishment Failure. For example, RAN logs of immediate MDT, logs of logged MDT, and logs of problem events such as Radio Link Failure, may all contain location and velocity information or data from which location and velocity can be estimated. MDT thus creates a need for an efficient and automatic management scheme for governing how the UE collecting event information shares the collected event information with various radio access networks. In the current art, such a management scheme does not exist.

Figure 2:
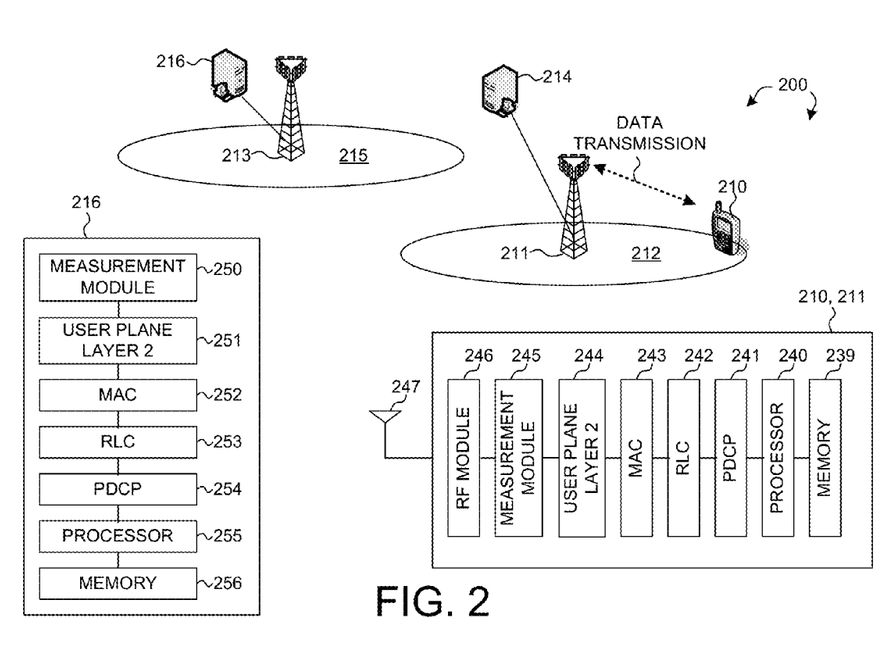
FIG. 2 illustrates a UE including a measurement module within a network.

FIG. 2 illustrates an exemplary method and apparatus for collecting and accessing measurement information (i.e. event information) in a mobile network 200. Mobile network 200 comprises a UE 210, an EUTRAN cell 212, and a UTRAN cell 215. The E-UTRAN cell 212 has an eNodeB 211. The UTRAN cell 215 has a NodeB 213 and a Radio Network Controller (RNC) node 216. Using 3GPP LTE system as an example, UE 210 subscribes cellular and IP services via E-UTRAN cell 212, and is served by the serving eNodeB 211.

UE 210 comprises memory 239, processor 240, Packet Data Convergence Protocol (PDCP) 241, Radio Link Control (RLC) 242, Media Access Control (MAC) 243, user plane layer two 244, measurement module 245, radio frequency (RF) module 246, and antenna 247. In another example, UE 210 further includes a location acquisition system allowing the reporting of location information with measurement information. The eNodeB 211 comprises memory 239, processor 240, Packet Data Convergence Protocol (PDCP) 241, Radio Link Control (RLC) 242, MAC 243, user plane layer two 244, measurement module 245, radio frequency (RF) module 246, and antenna 247. In another example, the eNodeB 211 further includes a location acquisition system allowing the reporting of location information with measurement information. RNC 216 comprises memory 256, processor 255, PDCP 255, RLC 253, MAC 252, user plane layer two 251, and measurement module 250. The different modules are functional modules that may be implemented by software, firmware, hardware, or any combination thereof. The functional modules, when executed by the processor, allow UE 210 to perform measurement information collection and reporting of measurement information (e.g. time information) and location information to the eNodeB 211. Similarly, for 3GPP UTRA system, UTRAN cell 215 provides services to users, and the UE perform measurement information collection and reporting of measurement information (e.g. time information) and location information to the RNC 216.

Figure 3:
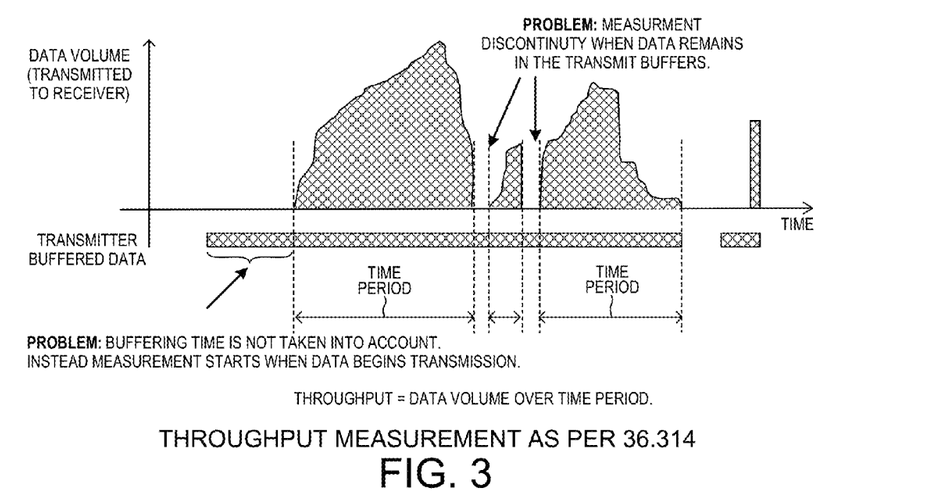
FIG. 3 is a diagram of a throughput measurement according to 3GPP TS 36.314.

FIG. 3 is a diagram of a throughput measurement as per 3GPP TS 36.314. The throughput measurement is calculated by dividing the data volume of a continuous block of data received by the time period over which the continuous data block was received.

Three continuous blocks of data are shown in FIG. 3. Each continuous block of data has a unique time over which the unique continuous block of data was received. FIG. 3 also illustrates the time from when the data is entered into the buffer to when all the data is empty from the buffer. As shown in FIG. 3, the three continuous blocks of data actually belong to a single data transmission. However, at the receiver terminal it is not known whether or not the three continuous blocks of data belong to a single data transmission. Therefore, the receiver terminal may interpret the three continuous blocks of data as three separate data transmissions. This misinterpretation of the three continuous data blocks will result in three separate throughput measurements. Further, each throughput measurement will be based upon by the incorrect time period. As shown in FIG. 3, the time period over which the data is received by the receiver is less than the time period from when the data was stored into the translator buffer to when the translator buffer was emptied. Therefore, the throughput measured by the receiver will be inaccurate and indicated a higher throughput than actually realized. In order to correct the throughput measurement inaccuracies illustrated in FIG. 3, it is necessary to find a solution that takes into account initial buffering before transmission and discontinuities within a single data transmission.

Figure 4:
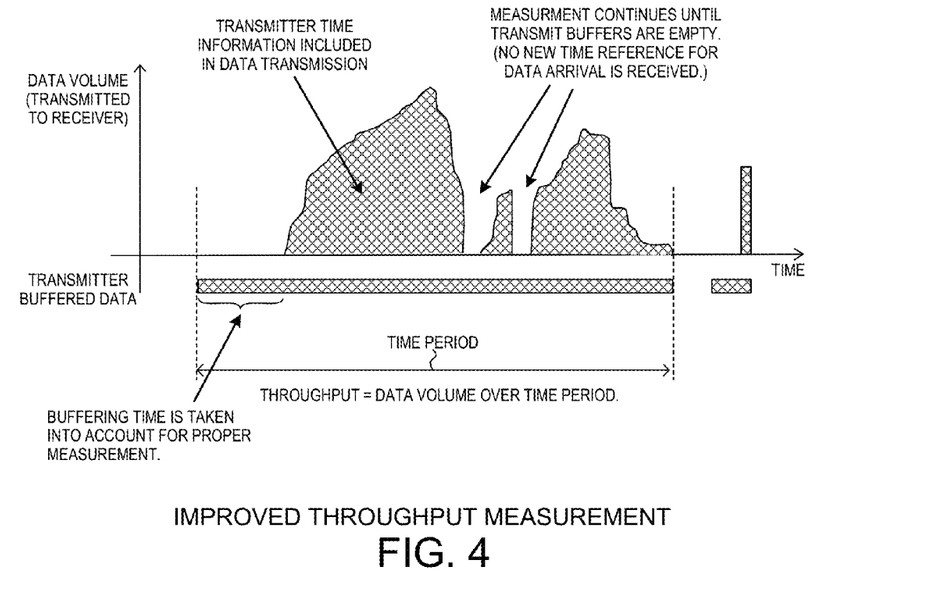
FIG. 4 is a diagram of an improved throughput measurement.

FIG. 4 is a diagram of an improved throughput measurement methodology. As discussed above, the throughput measurement is calculated by dividing the data volume of a continuous block of data received by the time period over which the continuous data block was received.

Three continuous blocks of data are shown in FIG. 4. Each continuous block of data has a unique time over which the unique continuous block of data was received. FIG. 4 also illustrates the time from when the data becomes available and starts being buffered to when all the data is empty from the buffer. As shown in FIG. 4, the three continuous blocks of data actually belong to a single data transmission. However, at the receiver terminal it is not known whether the three continuous blocks of data belong to a single data transmission. Therefore, as discussed above regarding FIG. 3, the receiver terminal may interpret the three continuous blocks of data as three separate data transmissions and failed to take into account the transmission buffering time. The improved throughput measurement methodology of FIG. 4, remedies this shortcoming by communicating transmitter time information (also referred to as "time information") in addition to the transmission data.

In one example, the transmitter time information indicates to the receiver when the transmission data first became available to the communication protocols, i.e. when stored into a communication protocol buffer for transmission. In another example, the transmitter time information indicates to the receiver when the transmission data was emptied from the transmitter buffer. In a third example, the transmitter time information indicates to the receiver that the three continuous blocks of data belong to the same data transmission.

Referring back to FIG. 2, the receiver may be a base station 211, a Radio Network Controller (RNC) 216, or a User Equipment (UE) 210. Likewise, the transmitter may be a base station 211, a Radio Network Controller (RNC) 216, or a User Equipment (UE) 210.

In one example, the time information includes one or more time references indicating time information regarding one or more data transmissions.

Upon receiving the time information and the data transmission from the transmitter, the receiver may determine the proper time over which to calculate the throughput measurement. The time information will indicate the time at which the data was input to the transmitter buffer before the transmission began. Therefore, the receiver will appropriately take into account the transmitter buffering time. The time information will also indicate that the three continuous data blocks belong to the same data transmission. Therefore, the receiver will not improperly interpret each continuous data block as a separate transmission. The overall result is that the receiver will be able to accurately calculate the throughput measurement due to the time information provided by the transmitter. Additionally the time information will give the receiver the possibility to separately take into account the initial buffering time, before the transmission started, which may be interesting, e.g. in order to complement already existing measurements.

Figure 5:
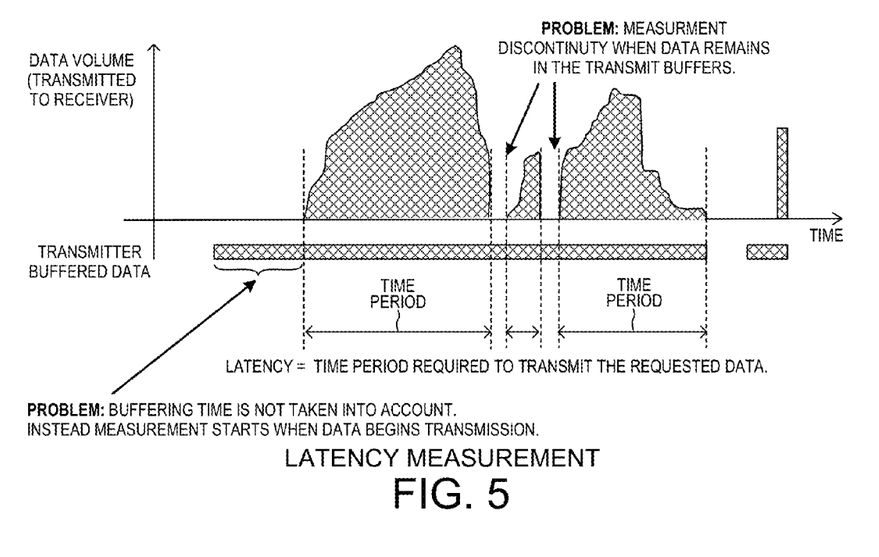
FIG. 5 is a diagram of a latency measurement.

FIG. 5 is a diagram of a first method of uplink latency measurement. The latency measurement is the time period from when the data transmission begins by the transmitter to when the complete data transmission is received by the receiver.

Three continuous blocks of data are shown in FIG. 5. Each continuous block of data has a unique time over which the unique continuous block of data was received. FIG. 5 also illustrates the time from when the data is entered into the buffer to when all the data is emptied from the buffer. As shown in FIG. 5, the three continuous blocks of data actually belong to a single data transmission. However, at the receiver terminal it is not known whether the three continuous blocks of data belong to a single data transmission. Therefore, the receiver terminal may interpret the three continuous blocks of data as three separate data transmissions. This misinterpretation of the three continuous data blocks will result in three separate latency measurements. Further, each latency measurement will be based upon the incorrect time period. As shown in FIG. 5, the time period over which the data is received by the receiver is less than the time period from when the data was stored into the translator buffer to when the transmitter buffer was emptied. Therefore, the latency measured by the receiver will be inaccurate and indicated a shorter latency measurement than actually realized. In order to correct the latency measurement inaccuracies illustrated in FIG. 5, it is necessary to find a solution that takes into account initial buffering before transmission and discontinuities within a single data transmission.

Figure 6:
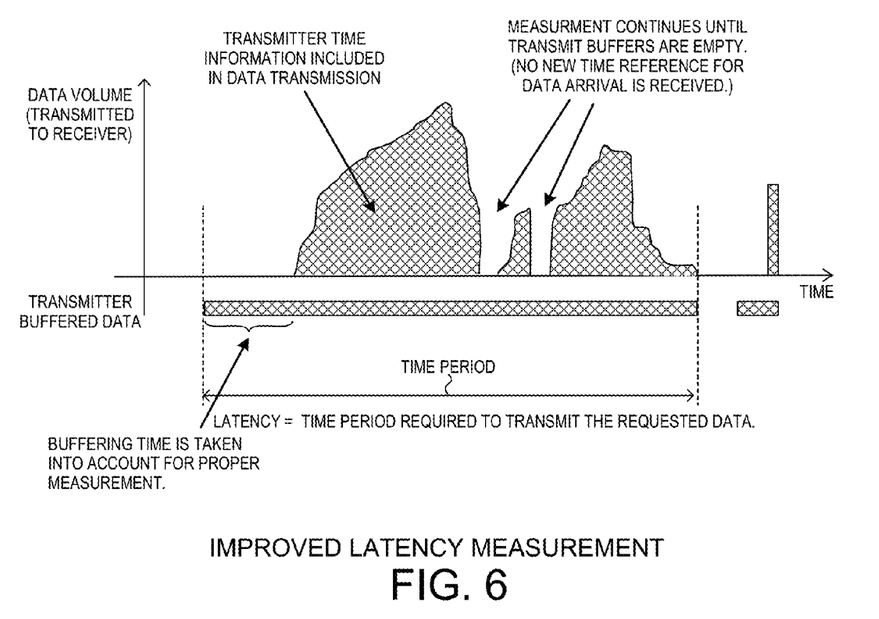
FIG. 6 is a diagram of an improved latency measurement.

FIG. 6 is a diagram of an improved latency measurement methodology. As discussed above, the latency measurement is the time period from when the data transmission begins by the transmitter to when the complete data transmission is received by the receiver.

Three continuous blocks of data are shown in FIG. 6. Each continuous block of data has a unique time over which the unique continuous block of data was received. FIG. 6 also illustrates the time from when the data is entered into the buffer to when all the data is empty from the buffer. As shown in FIG. 6, the three continuous blocks of data actually belong to a single data transmission, a single data unit from application point of view. However, at the receiver terminal it is not known whether or not the three continuous blocks of data belong to a single data transmission. Therefore, as discussed above regarding FIG. 5, the receiver terminal may interpret the three continuous blocks of data as three separate data transmissions and failed to take into account the transmission buffering time. The improved latency measurement methodology of FIG. 6, remedies this shortcoming by communicating transmitter time information (also referred to as "time information") in addition to the transmission data.

In one example, the transmitter time information indicates to the receiver when the transmission data became available to the communication protocols, i.e. when first stored into the communication protocol buffer for transmission. In another example, the transmitter time information indicates to the receiver when the transmission data was emptied from the transmitter buffer. In a third example, the transmitter time information indicates to the receiver that the three continuous blocks of data belong to the same data transmission.

Referring back to FIG. 2, the receiver may be a base station 211, a Radio Network Controller (RNC) 216, or a User Equipment (UE) 210. Likewise, the transmitter made be a base station 211, a Radio Network Controller (RNC) 216, or a User Equipment (UE) 210.

In one example, the time information includes one or more time references indicating time information regarding one or more data transmissions, i.e. one or more data units.

Upon receiving the time information and the data transmission from the transmitter, the receiver may determine the proper time over which to calculate the latency measurement. The time information will indicate the time at which the data was input to the communication protocol buffers before the transmission began. Therefore, the receiver will appropriately take into account the transmitter buffering time. The time information will also indicate that the three continuous data blocks belong to the same data transmission. Therefore, the receiver will not improperly interpret each continuous data block as a separate transmission. The overall result is that the receiver will be able to accurately calculate the latency measurement due to the time information provided by the transmitter.

Figure 7:
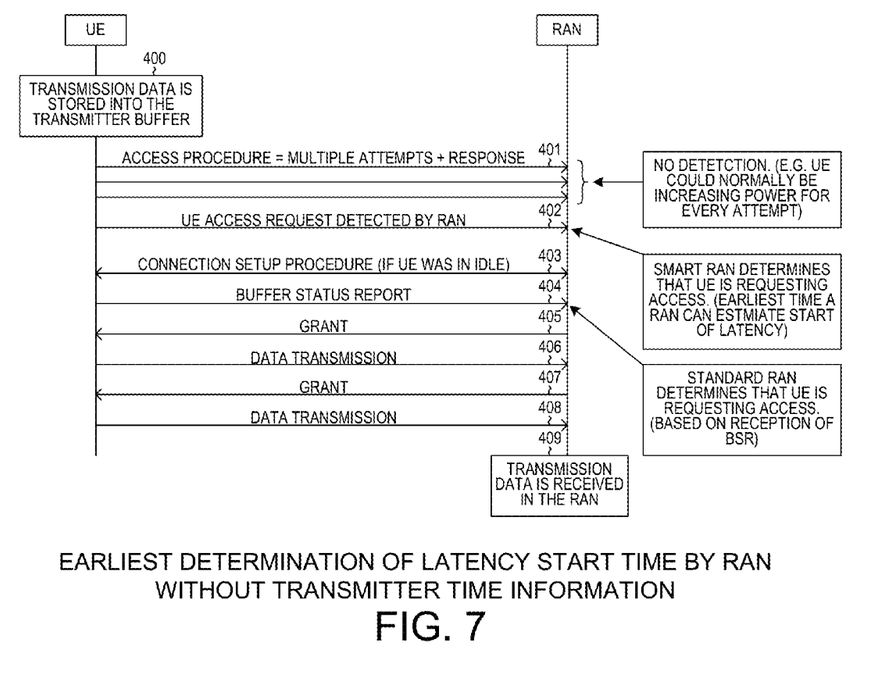
FIG. 7 illustrates the earliest determination of latency start time by ran without transmitter time information.

FIG. 7 illustrates the earliest possible detection of latency start time by the RAN without transmitter time information. In the absence of time information provided by the transmitter, the earliest time that a smart RAN can estimate the start of the latency measurement is when the RAN determines that the UE is requesting access at step 402. At this step the RAN does not know why the UE requests access or whether the UE has any data at all for transmission. A smart RAN could however record everything a UE does, and later review the records in cases there were data for which uplink latency or uplink throughput should be measured. However, such operation of course comes with the drawback of recording every access in the system, which could be significant overhead. In the absence of time information provided by the transmitter, the earliest time that a standard RAN can estimate the start of the latency measurement is when the RAN determines that the UE has user data to be measured for transmission, based on reception of buffer status report (BSR) in step 404. The steps that must occur before the RAN can make this determination are illustrated in FIG. 7.

In step 400 the transmission data becomes available to the communication protocols and is stored into the communication protocols buffer. The UE performs an access procedure including multiple attempts and responses from the RAN. (Step 401). This step may include multiple transmissions from the UE to the RAN. For example, if the first transmission does not have a high enough power level then the transmission may not be detected by the RAN. When the transmission is not detected by the RAN, then the UE must send another transmission at a higher power level. In step 402, an UE access request is detected by the RAN, and a "smart" RAN would record this point in time just in case the time need to be used later for a QoS measurement. The smart RAN would also need to do other estimations in order to guess well if this time information is valid or not, e.g. keep track of time between the access and reception of BSR to deduce if the buffered data was the actual cause of the access. A connection set up procedure begins in step 403. Then in step 404 a buffer status report (BSR) is sent to the RAN from the UE. Step 404 is when the standard RAN can first reliably determine that the UE is requesting access for transmission of data for which QoS shall be measured. Therefore, step 404 would be the earliest time that a standard RAN can estimate the start of the latency measurement. In step 405, UE access is granted. In response, the UE begins transmitting a first segment of data to the RAN (step 406). In step 407, the UE is again granted access. In response, the UE begins transmitting a second segment of data to the RAN (step 408). In step 409, the complete set of transmission data is received by the RAN.

As illustrated above, the earliest latency start time they can be determined by a RAN is not accurate. Multiple steps must occur before a smart RAN can estimate a latency start time. Even more steps must occur before a standard RAN can reliably determine a latency start time. Therefore, latency measurements based upon RAN estimated latency start times are inaccurate. As discussed regarding FIGS. 4 and 6 above, the latency measurement can be greatly improved by using transmitter time information. The transmitter time information can indicate when the transmission data was first stored into the transmission buffer of the transmitter. Upon receiving the transmitter time information the receiver can accurately determine the latency measurement start time independent of the class of RAN operating the wireless system.

Figure 8:
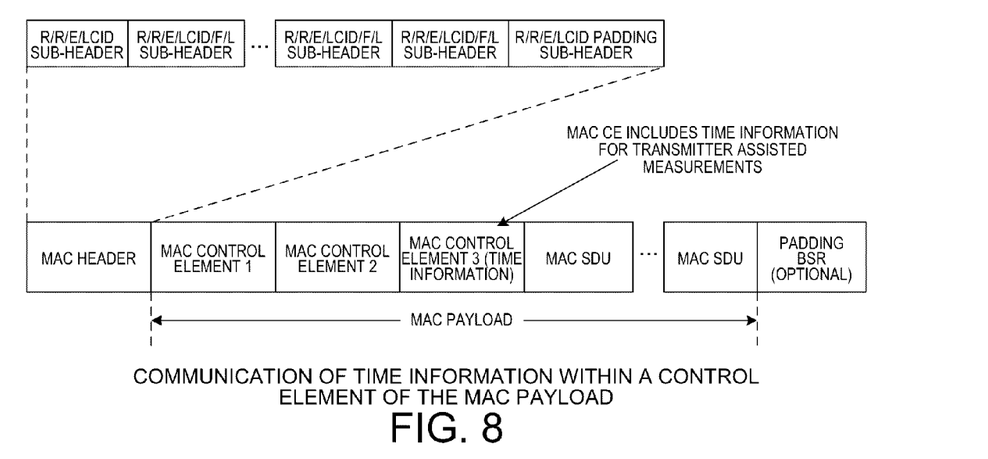
FIG. 8 illustrates communication of time information within a control element of the Media Access Control (MAC) payload.

FIG. 8 is a diagram illustrating the communication of time information within a control element of the MAC payload. The MAC header and MAC payload is illustrated in FIG. 8. The MAC header includes multiple sub-headers. The MAC payload includes multiple MAC control elements and multiple MAC SDUs. A padding element may also be included in the MAC payload.

In one example, one or more of the MAC control elements include time information. The Mac control elements within the MAC payload are then transmitted with the data transmission to the receiving device. Upon receiving the data transmission, the receiving device acquires time information from the MAC control element containing the time information. In one example, the mapping between the control element containing the time information and the data for which it applies is predefined, e.g. they are in the same order. In another example, the mapping between the control elements containing the time information and the data is not predefined. When not predefined, explicit information is provided by the transmitter for the mapping between time information and the data for which the time information applies.

Figure 9:
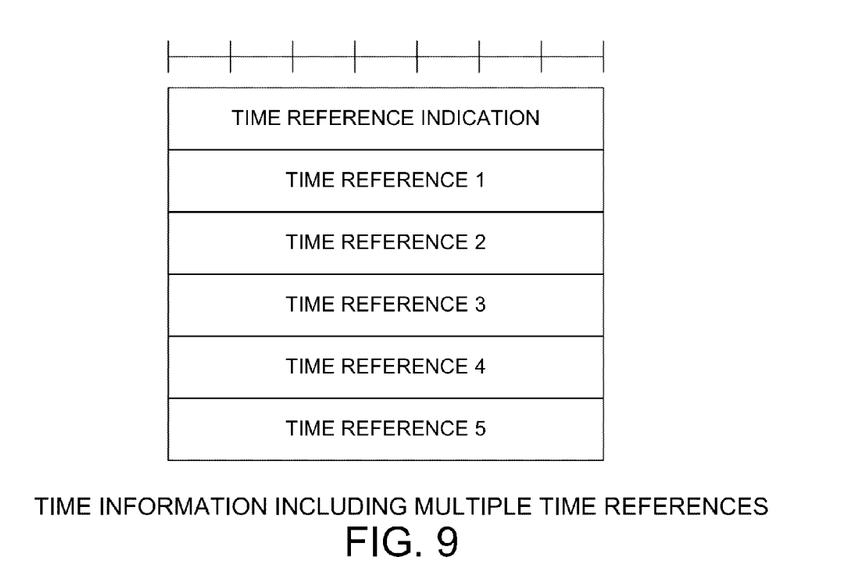
FIG. 9 illustrates time information including multiple time references.

FIG. 9 is a diagram illustrating time information including multiple time references. The time information communicated by the transmitter may include multiple time references. At good radio conditions, large blocks of data could be transmitted, but the initial latency may anyway be quite long, so while a piece of data, a protocol SDU is buffered waiting for transmission, more pieces of data could be made available for transmission and buffered. Each such piece of data could be buffered different amount of time. Data with different available or different arrival times could be sent at the same time, needing different time information for accurate latency or time determinations. The time reference may indicate a time reference relative to the timing of a wireless interface connection (e.g. a System Frame Number (SFN), a Connection Frame Number (CFN), a relative count of frame numbers, a count of sub-frames, or a count of Time Transmission Intervals (TTIs)).

Figure 10:
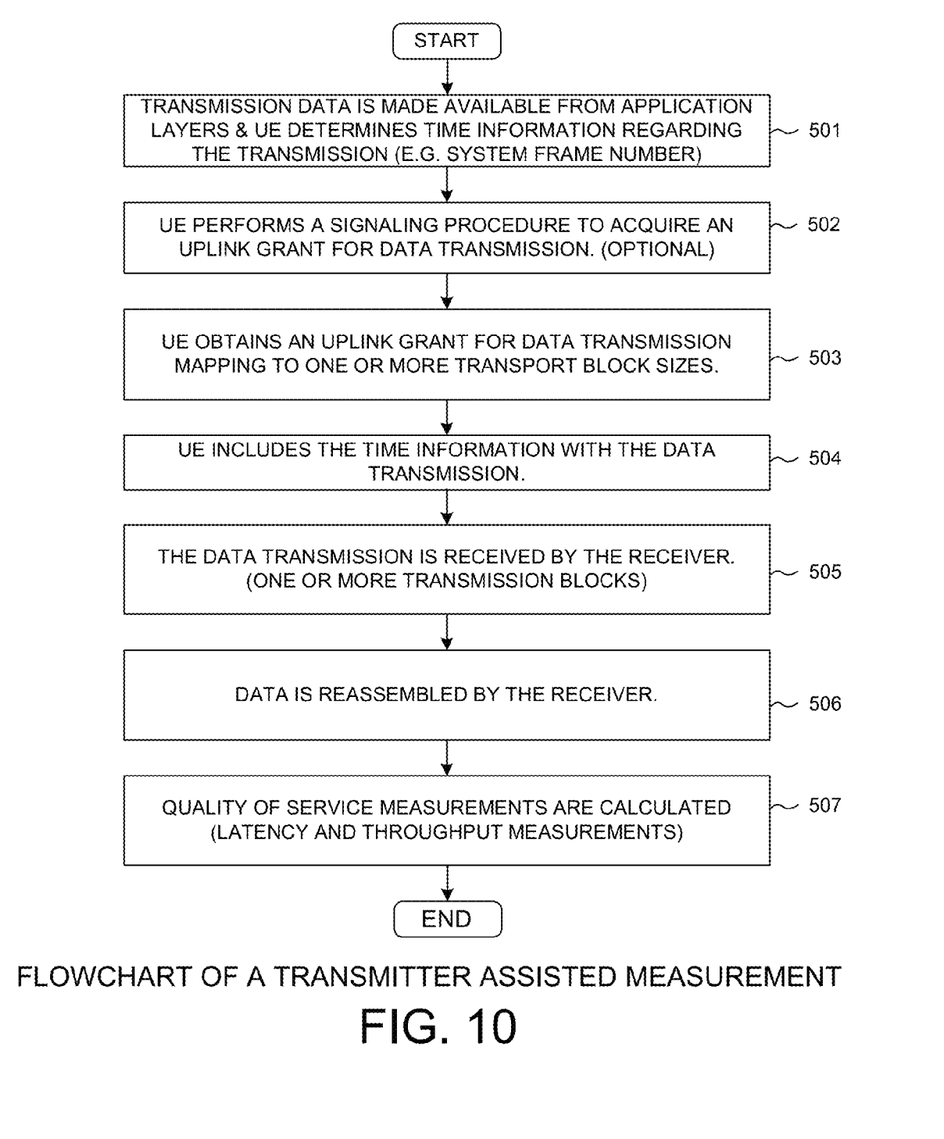
FIG. 10 is a flowchart of a transmitter assisted measurement.

FIG. 10 is a flowchart of a transmitter assisted measurement. In step 501, the transmission data is made available from the application layer and the UE determines time information regarding the transmission (e.g. SFN, CFN, TTI, etc. . . . ). The UE then performs a signaling procedure to acquire an uplink grant for data transmission (step 502). In step 503, the UE obtains an uplink grant for data transmission mapping to one or more transport blocks of certain sizes. The UE then includes the time information with the data transmission (step 504). In step 505, the data transmission is received by the receiver. The data transmission may include one or more data transport blocks. As discussed above, the receiver may be a base station or a Radio Network controller (RNC). The data received is been reassembled by the receiver (step 506). In step 507, quality of service measurements are calculated by the receiver. As discussed above, the quality of service measurements may include performance measurements, such as latency measurements or throughput measurements.

Figure 11:
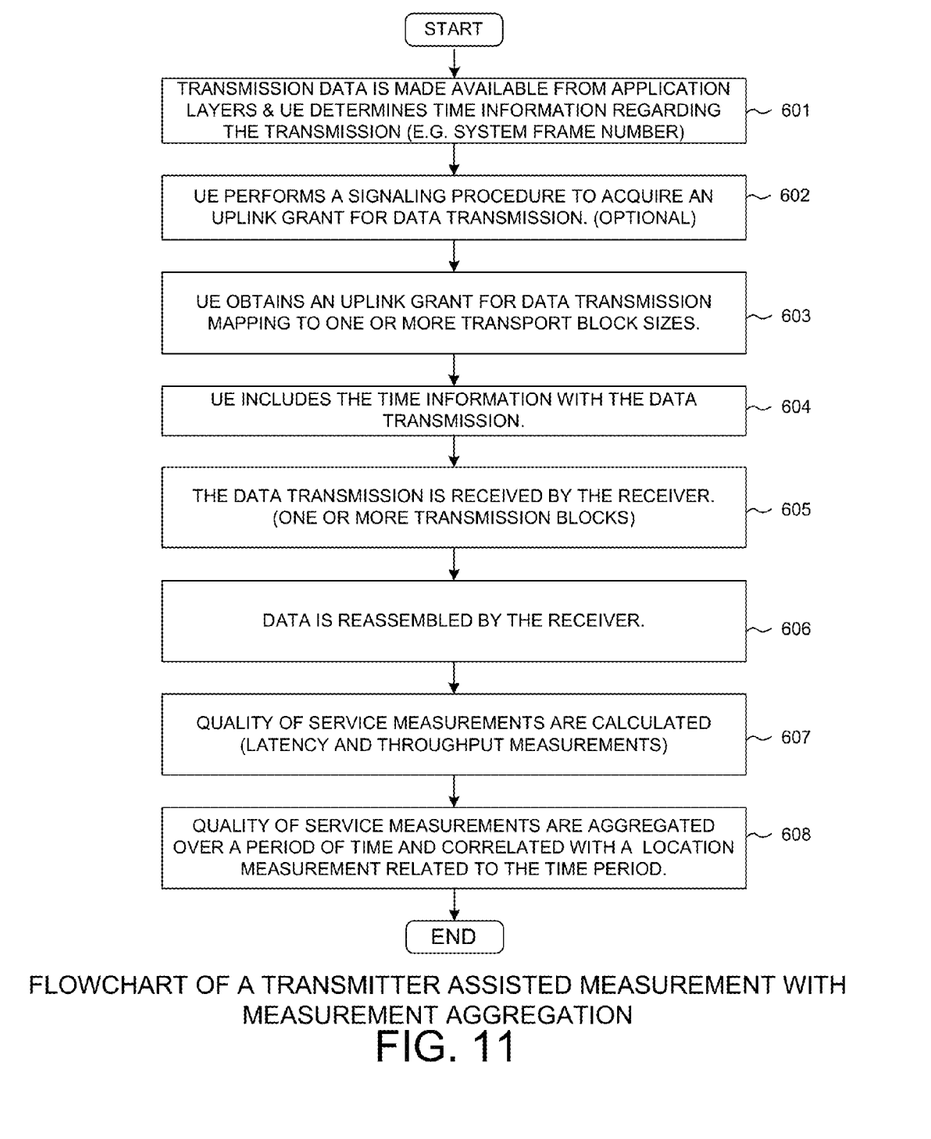
FIG. 11 is a flowchart of a transmitter assisted measurement with measurement aggregation.

FIG. 11 is a flowchart of a transmitter assisted measurement with measurement aggregation. In step 601, the transmission data is made available from the application layer and the UE determines time information regarding the transmission (e.g. SFN, CFN, TTI, etc. . . . ). The UE then performs a signaling procedure to acquire an uplink grant for data transmission (step 602). In step 603, the UE obtains an uplink grant for data transmission mapping to one or more transport blocks of certain sizes. The UE then includes the time information with the data transmission (step 604). In step 605, the data transmission is received by the receiver. The data transmission may include one or more data transport blocks. As discussed above, the receiver may be a base station or a Radio Network controller (RNC). The data received is been reassembled by the receiver (step 606). In step 607, quality of service measurements are calculated by the receiver. As discussed above, the quality of service measurements may include performance measurements, such as latency measurements or throughput measurements. The quality of service measurements are then aggregated over a period of time and correlated with location measurement related to the time period (step 608). The aggregated quality of service measurement may be in average of quality of service measurements, a histogram of quality of service measurements, or a worst case selection of quality of service measurements.

Figure 12:
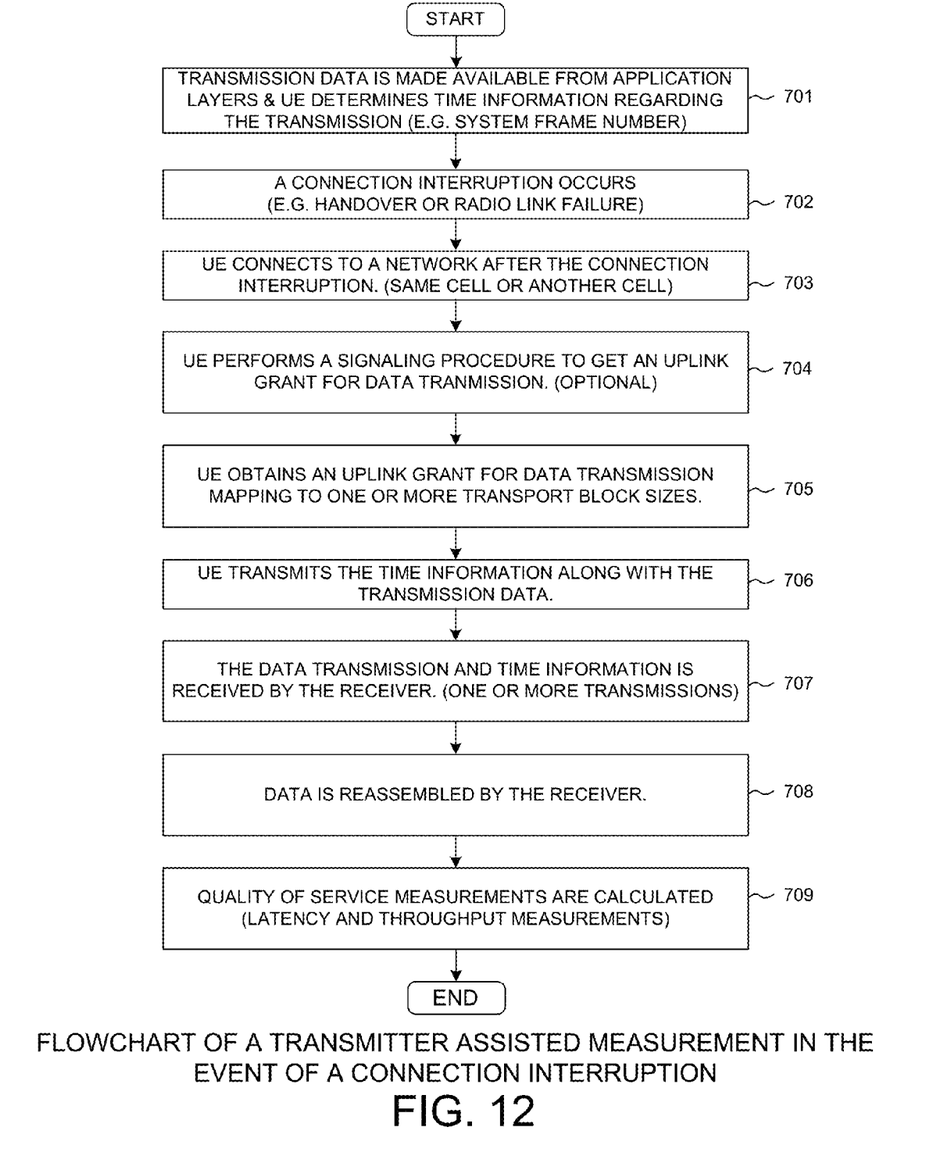
FIG. 12 is a flowchart of a transmitter assisted measurement.

FIG. 12 is a flowchart of transmitter assisted measurement in the event of a connection interruption. In step 701, the transmission data is made available from the application layer and the UE determines time information regarding the transmission (e.g. SFN, CFN, TTI, etc. . . . ). A connection interruption occurs (step 702). A connection interruption may be due a variety of events, such as a handover event or a radio link failure. In step 703, the UE connects to a network after the connection interruption. The UE can either connect to the original network or to a new network (same cell or another cell). The UE then performs a signaling procedure to get an uplink grant for data transmission. From user plane protocols point of view transmission interruptions result in similar actions regardless the triggers and circumstances. Transmission interruptions may involve reset or reestablishment of some or all user plane protocols. If MAC and RLC are reset/reestablished, then the PDCP layer could trigger transmission recovery, or if all layer 2 protocols are reset/reestablished the recovery need to be triggered by the control plane, the radio resource control (RRC) layer. In step 705, the UE obtains an uplink grant for data transition mapping to one or more transport blocks of certain sizes. The UE then transmits the time information along with the transmission data (step 706). In step 707, the data transmission and time information is received by the receiver. As discussed above, the receiver may be a base station or a radio Access Network controller (RNC). The data has been reassembled by the receiver (708). In step 709, quality of service measurements are calculated by the receiver. As discussed above, the quality of service measurements may include performance measurements, such as latency measurements or throughput measurements.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) receiving a regular data transmission from a transmitter by a receiver, wherein the regular data transmission has one or more continuous data blocks that are transmitted and received over a time period;
   (b) retrieving a time information included in the regular data transmission at the receiver, wherein the time information indicates when the one or more data blocks of the regular data transmission were available for transmitting from an application layer at the transmission buffer of the transmitter;
   (c) determining a quality of service (QoS) measurement based on the regular data transmission and the time information;
   (d) observing a radio connection interruption, wherein a part of the regular data transmission failed due to a connection failure; and
   (e) retransmitting the part of the regular data transmission failed in (d), wherein a retransmission does not include the time information.

2. The method of claim 1, wherein the receiver is a base station.

3. The method of claim 1, wherein the receiver is a radio network controller (RNC).

4. The method of claim 1, wherein the QoS measurement is a latency measurement, wherein the latency measurement is a difference between a data transmitting time and a data receiving time, and wherein the data transmitting time is determined based on the time information received.

5. The method of claim 4, wherein the data receiving time is when the one or more continuous data blocks received have been reassembled.

6. The method of claim 1, wherein the QoS measurement is a throughput measurement, wherein the throughput measurement is based on a time reference and a data volume, and wherein the time reference is based on the time information.

7. The method of claim 1, wherein the time information indicates a time reference relative to a wireless connection timing, and wherein the time reference is indicated by a System Frame Number (SFN), a Connection Frame Number (CFN), a relative count of frame numbers, a count of sub-frames, or a count of Time Transmission Intervals (TTIs).

8. The method of claim 1, further comprising:
   (f) determining an aggregated QoS measurement based at least in part on the QoS measurement, wherein the aggregated QoS measurement is an average of QoS measurements, a histogram of QoS measurements, or a worst case selection of QoS measurements.

9. A method, comprising:
   (a) preparing a regular data transmission by a user equipment (UE), wherein the regular data transmission has one or more continuous data blocks that are transmitted and received over a time period;
   (b) determining time information of the regular data transmission, wherein the time information indicates when the one or more continuous data blocks were made available for transmission at a transmission buffer of an application layer;
   (c) performing the regular data transmission, wherein the regular data transmission includes the one or more continuous data blocks and the time information;
   (d) observing a radio connection interruption, wherein a part of the regular data transmission failed due to a connection failure of the UE; and
   (e) retransmitting the part of the regular data transmission failed in (d), wherein a retransmission does not include the time information.

10. The method of claim 9, wherein the time information indicates a time reference relative to a wireless interface connection timing, and wherein the time reference is a System Frame Number (SFN), a Connection Frame Number (CFN), a relative count of frame numbers, a count of sub-frames, or a count of Time Transmission Intervals (TTIs).

11. The method of claim 9, further comprising:
    (f) observing a transmission interruption, wherein a part of the regular data transmission failed due to a connection failure of the UE;
    (g) recovering the data transmission, wherein the recovery involves a reset or a reestablishment of layer two protocols; and
    (h) retransmitting the time information and the part of the regular data transmission that failed in (d).

12. The method of claim 9, further comprising:
    (f) observing a radio connection interruption, wherein a part of the regular data transmission failed due to a connection failure of the UE;
    (g) establishing a new radio connection; and
    (h) retransmitting the time information and the part of the regular data transmission failed in (d).

13. The method of claim 9, wherein the time information is included in a Packet Data Convergence Protocol (PDCP) status report.

14. The method of claim 9, wherein the time information is sent by a layer two protocol, and wherein the layer two protocol is included with the one or more continuous data blocks.

15. The method of claim 9, wherein the time information is sent in a media access control (MAC) control element.

16. The method of claim 9, wherein at least one index value is provided with the time information, and wherein the index value refers to a Service Data Unit (SDU) for which the time information is applicable.

17. The method of claim 16, wherein the index value is a Packet Data Convergence Protocol (PDCP) sequence number or Radio Link Control (RLC) sequence number.

18. The method of claim 9, wherein the time information is transmitted when sufficient space is available in a transport block after space for both data and mandatory layer two overhead have been allocated.

* * * * *